United States Patent [19]

Kent et al.

[11] Patent Number: 5,706,026
[45] Date of Patent: Jan. 6, 1998

[54] FINGER OPERATED DIGITAL INPUT DEVICE

[76] Inventors: Robert Hormann Kent, 1735 E. Bayshore Rd., 3-A, Redwood City, Calif. 94063; John Dyer Wentz, 209 E. 88th St., Apt. 5C, New York, N.Y. 10128

[21] Appl. No.: 404,135

[22] Filed: Mar. 13, 1995

Related U.S. Application Data

[63] Continuation of Ser. No. 8,188, Jan. 25, 1993, abandoned.

[51] Int. Cl.$^6$ .................................................. G09G 5/00
[52] U.S. Cl. .................................................. 345/156; 345/163
[58] Field of Search ............................ 340/706, 709, 340/710, 712; 341/20, 21; 178/18, 19, 20; 345/157, 159, 163, 164, 165, 180, 156, 160, 168, 169

[56] References Cited

U.S. PATENT DOCUMENTS

| | | | |
|---|---|---|---|
| 198,484 | 12/1877 | Briggs | 401/8 |
| 684,685 | 10/1901 | Gerst . | |
| 688,834 | 12/1901 | Deck | 401/221 |
| 2,509,837 | 5/1950 | Niizawa | 401/7 |
| 2,946,311 | 7/1960 | Craig | 401/109 |
| 3,304,434 | 2/1967 | Koster | 345/165 |
| 3,835,453 | 9/1974 | Narayanan | 340/146.35 Y |
| 4,201,489 | 5/1980 | Zapp | 400/485 |
| 4,414,537 | 11/1983 | Grimes | 340/365 R |
| 4,538,476 | 9/1985 | Luque | 74/471 X |
| 4,642,459 | 2/1987 | Caswell | 345/179 |
| 4,686,332 | 8/1987 | Greanias et al. | 345/180 |
| 4,698,626 | 10/1987 | Sato | 340/710 |
| 4,719,455 | 1/1988 | Louis | 340/709 |
| 4,721,308 | 1/1988 | Trimble | 273/148 B |
| 4,754,268 | 6/1988 | Mori | 340/710 |
| 4,780,707 | 10/1988 | Selker | 345/163 |
| 4,827,123 | 5/1989 | Gray | 250/231.14 |
| 4,891,632 | 1/1990 | Chang | 340/709 |
| 4,924,216 | 5/1990 | Leung | 340/709 |
| 4,927,987 | 5/1990 | Kirchgessner | 200/5 R |
| 4,954,817 | 9/1990 | Levine | 340/706 |
| 5,012,230 | 4/1991 | Yasuda | 340/706 |
| 5,027,115 | 6/1991 | Sato | 341/13 |
| 5,095,302 | 3/1992 | McLean et al. | 340/710 |
| 5,144,594 | 9/1992 | Gilchrist | 178/18 |
| 5,166,668 | 11/1992 | Aoyagi | 340/710 |
| 5,253,160 | 10/1993 | Lin | 345/163 |

FOREIGN PATENT DOCUMENTS

| | | |
|---|---|---|
| 2-268315 | 11/1990 | Japan . |
| 3-75913 | 3/1991 | Japan . |

*Primary Examiner*—Chanh Nguyen
*Attorney, Agent, or Firm*—Eckert Seamans Cherin & Mellott

[57] ABSTRACT

A digital input device has a thimble worn on a finger and operated as a mouse for displacement encoding or as a pointer for angular encoding, using a base unit. The thimble can also be attached to a stylus to form a tracing pen or joystick handle. A sensor preferably includes a contact roller at an end of the thimble that rotates with movement over a surface. The sensor emits a signal as a function of incremental displacement of the sensor over a surface, in X and Y directions. The sensor couples to the base unit at a universal joint and the base unit has a cup-shaped contact surface for encoding angular displacement around the universal joint, using displacement of the sensor over the cup-shaped surface. The contact roller is mechanically arranged to pass a coding strip having reflective, transmissive or magnetic stripes before a sensing element. The sensor can be pivoted back on the finger to enable typing. When disengaged from the base unit, the sensor can roll on any surface, and with the stylus can be used as a tracing pen. By scaling the displacement of the input device to equal displacement of a cursor or pointer controlled by software, the input device can be used directly on a display screen.

17 Claims, 5 Drawing Sheets

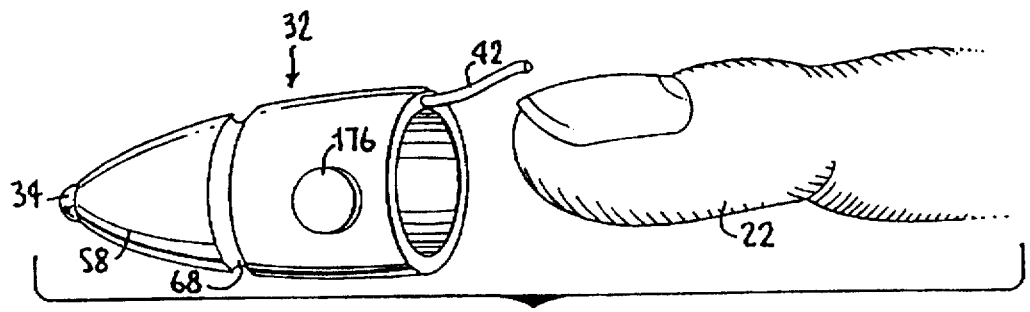
FIG. 4
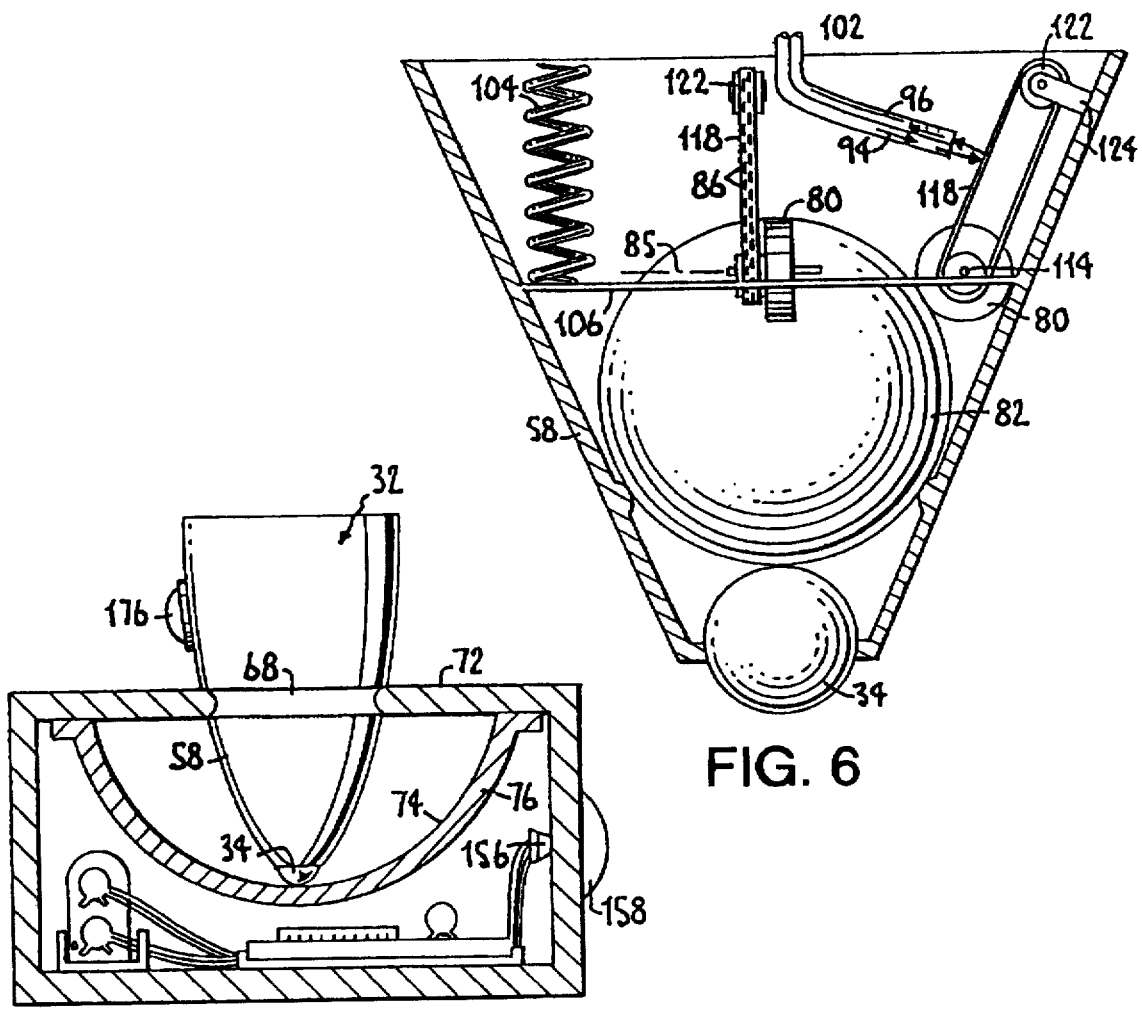
FIG. 6
FIG. 5

FINGER OPERATED DIGITAL INPUT DEVICE

This is a continuation of application Ser. No. 08/008,188 filed Jan. 25, 1993 now abandoned.

BACKGROUND OF THE INVENTION

1. Field of the Invention

The invention relates to the field of input devices for positioning the cursor of computer displays and the like, and in particular to a mouse-like input device arranged for alternative uses for data input. The invention has a thimble for attachment to a finger, with a motion sensing roller. The thimble enables input by linear or angular displacement or pointing, either by displacement on a separate surface or by inclination relative to a base unit that has a contoured surface for interaction with the roller. The sensor portion alternatively can be retracted for typing, and the thimble can receive a stylus in lieu of the user's finger, for additional options.

2. Prior Art

Computer input devices for cursor positioning are known in several variations. The most common variant, known as a mouse, has a small hand held housing having one or more sensing rollers on the underside, typically coupled by a cable to the serial port of a computer terminal such as an IBM compatible, Apple or Macintosh personal computer. The mouse produces digital pulses as a function of movement of the housing in an X or Y direction on a surface. Usually the mouse is moved over a resilient mouse pad on which the roller engages frictionally. The mouse pulses are interpreted by the computer in a manner similar to the up/down/left/right arrow keys on the computer keyboard, for translational displacement of a cursor which may move a sprite, select among displayed options, draw a figure, etc. Frequently, the mouse also has switches that the software interprets in a manner similar to the keyboard "enter" key, or to summon a "help" function. These aspects of the mouse are standardized, and many programs have been published that make use of the mouse to enable the user to input data in a positional manner, as opposed to typing text commands or incrementally operating positional displacement keys.

There are a number of alternative input devices that operate in a manner similar to the well-known mouse, but are perhaps more specialized. A joystick is an example adapted for input to video games and the like, which typically involve aiming functions. The joystick also produces pulses that are interpreted by the software for X and Y displacement of a cursor, sprite or other form. However, the joystick produces pulses as a function of angular displacement of the joystick handle relative to a base. The handle is permanently coupled to the base at a universal joint. Often the user holds the base in one hand and the handle in the other. However, the base remains substantially stationary in use. The aiming function of a joystick is particularly useful for guiding directional aspects of a software program display, such as simulation of flying an airplane or spacecraft.

Another alternative is known as a trackball. The trackball has a relatively large roller ball exposed at the top of a stationary housing. Pulses are produced as a function of rotation of the ball in an X or Y direction, which the user accomplishes by manual contact of the user's fingers and the roller ball. The trackball is useful alternatively for operation of games, and in the same manner as a mouse, namely to "point and click". Unlike a mouse, the housing of the trackball remains stationary.

The present invention has aspects of angular displacement and translational displacement, and is thus useful in situations which are functionally similar to directional pointing and those that relate to translation of the input device to control translation of a cursor. Whereas the input device is operated by the user via a thimble that fits over the user's finger, a natural pointing motion is used to control the software program.

Devices are known that use translation of a finger as an input mechanism. In U.S. Pat. No. 4,927,987—Kirchgessner, a base having a through opening is held by the user in one hand, and the user places a finger of the other hand in the opening. Four orthogonally placed pushbutton switches are arranged in the opening for producing switch closures in the plus and minus directions for X and Y. Inasmuch as the input device can only detect whether pressure sufficient to operate the pushbutton switch is being exerted by the user's finger, other processing steps are needed to interpret the input. In particular, switch closures are simply incremental signals similar to the action of the directional arrow keys. A timing function is needed to convert the switch input to a particular amount of cursor displacement if the switch closures are to produce anything more than a single incremental displacement in the chosen direction, e.g., with a switch closure longer than a predetermined interval being interpreted as a command to change the cursor displacement speed. Although the user can nudge the cursor in a chosen direction or with a timing function can accelerate or decelerate, he cannot simply point with such a device.

U.S. Pat. No. 4,721,308—Trimble discloses another device with a finger opening. In this case, the user's thumbs fit from opposite sides into an opening in a panel that is rotatable relative to the housing. The user "twiddles" his thumbs in the opening and the circuitry detects rotation of the panel relative to the housing. Detection is accomplished by photodetector pairs responsive to alternating light and dark bands on the perimeter of the rotatable panel.

U.S. Pat. Nos. 5,012,230—Yasuda and 4,719,455—Louis disclose finger operated input devices that each have a movable slider panel disposed in a housing having an opening for the user's finger. The opening is large enough to permit the user to move the panel about over a range of X and Y positions. In Yasuda, four spaced pairs of stationary switching contacts are disposed in the housing under the slidable panel and the panel is conductive. By moving the panel over the switching contacts, one or two of the four switching contacts becomes bridged. This device is similar to Kirchgessner in that it provides only on and off switching inputs for the plus and minus X and Y directions, and as such has limited usefulness for pointing.

In Louis, a continuously variable arrangement is disclosed. The slider has a reflective target on its underside. A laser beam is scanned over the underside of the slider in a raster pattern, and a photodetector produces a pulse when the laser beam is reflected by the target. A microprocessor controller is required to control the laser scanning and to compute the location of the slider in its field of displacement by comparing the timing of the detected pulse to the timing of the raster. This arrangement is quite complicated and expensive, but provides a continuously variable input means for locating a cursor in a field.

The device of Louis is somewhat different than the typical mouse in that it attempts to maintain the position of the movable slider in the available field rather than simply to provide an input for incremental displacement of a cursor or the like, whose position is maintained by the software of a computer terminal.

Additional finger related input devices include the mouse having a Z input controlled by the extent of insertion of the user's finger axially into an opening in the mouse, disclosed in U.S. Pat. No. 5,095,302—McLean et al. U.S. Pat. No. 4,201,489—Zapp discloses a pushbutton key that is not only pushed, but also rocked angularly to provide an additional type of switching input for a pushbutton switch. U.S. Pat. No. 4,414,537—Grimes discloses a glove that is instrumented with a variety of switches that are responsive to flexion and extension of the user's fingers.

The foregoing devices do not provide a practical mouse-like input means that enables index finger pointing. To the extent that the user's finger must be engaged in a housing, it is not possible to "wear" the device and also to type. In each case, the finger-engaging structures remain in the housing, which is necessary to obtain the desired input signal. Therefore, a user cannot switch back and forth between the finger operated input device and other input devices. Nor is it possible in these devices to use the input device in alternative manners as appropriate for different software functions (e.g., aiming vs. drawing, etc.).

SUMMARY OF THE INVENTION

It is an object of the invention to provide a finger operated digital input device that produces X and Y displacement signals as a function of the user pointing a finger such as the index finger.

It is another object of the invention to provide a finger input device that is useful alternatively in a base or housing and on a surface such as a mouse pad.

It is a further object to provide a finger input device that can be worn on a finger and moved to a retracted position to permit the user to type.

It is still another object of the invention to provide a finger input device having a finger displacement detector at the end of a thimble worn on the finger, the thimble being detachably arranged in a housing via a universal joint, and the housing having a shaped surface over which the detector is displaced.

It is another object of the invention to provide a single data input device that is alternatively useful for angular pointing via a handle or via the user's finger, and for drawing over a surface either with the finger or as a stylus.

It is a further object of the invention to provide a finger input device that is uncomplicated in structure and circuitry, produces X and Y displacement pulses for input to a digital computer.

These and other objects are accomplished in a digital input device having a thimble that can be worn on a user's finger or attached on the end of a stylus. Means are provided for sensing the displacement of the thimble relative to a surface, such as a contact roller arrangement or an electro-optical arrangement whereby the sensing means distinguishes grid lines or the like on a surface. In the contact roller arrangement, for example, a small contact roller at an end of the thimble rotates with movement over a surface, and a detector circuit emits a pulsed signal responsive to incremental rotation. Sensing rollers that preferably bear against an intermediate larger roller are rotatable on mutually perpendicular axes for detection of X and Y displacement. The sensing rollers pass a surface having regular variations such as reflective or light transmissive stripes before a sensing element, which variations can be on endless belts. Two lines of digital code and two sensing elements can be used for each of the mutually perpendicular directions, for encoding both the direction and extent of movement of the contact roller.

In an electro-optical arrangement, the sensing means can be a photodetector operable to detect passage of the device over grid lines on a surface, such as vertical and horizontal grid lines that are distinguishable from one another by color. An electromagnetic arrangement is also possible, e.g., with grid lines defined by magnetic variations.

The thimble has a mounting part sized to engage the user's finger and a sensor housing. The sensor housing preferable is operatively positioned at the distal end of the user's finger, and can be pivoted back from the mounting part to enable typing. The thimble can also receive a stylus, for example having an end section of dimensions comparable to a finger, or being provided in a range of sizes, for different size fingers and for receiving a thin stylus.

The device fits into a base unit at a detachable universal joint, constraining the contact roller or other sensor means to reside along a contoured surface, in particular a spherical surface concentric with the universal joint. A contoured element is provided in the base unit for interaction with the sensing means along this surface, e.g., a frictional surface for interaction with a sensing roller.

The device is disengageable from the base unit and can be passed over any surface. When used as a finger attached sensor or with a stylus, the device enables the user to point to and trace over items such as maps or figures. By scaling the displacement of the input device to equal displacement of a cursor, pointer or the like which is to be controlled on a display screen, the input device can be used directly on the display screen.

In a sensor arrangement having roller balls, a spring biasing means can urge together at least two rollers in series, including the contact roller that engages the contoured base surface or another surface. For this purpose, the sensing rollers can be mounted on a support operable to bear against the intermediate roller ball, the support being urged toward the intermediate roller ball and toward the contact roller by at least one spring. The support can have a low friction plate, for example having an opening fitting over the intermediate roller ball and lined with Teflon. The sensing rollers can be mounted on the support so as to rotate on perpendicular axes at the plate. A metering belt for each of the sensing rollers can be provided to rotate with a respective one of the sensing rollers. The metering belt has regular variations in at least one of light reflectivity and light transmissiveness, the sensing element being operatively directed at the metering belt, for producing output pulses.

In a preferred embodiment, the output signal is coupled to a computer terminal or the like over a wireless signalling path. A battery powered transmitter is coupled to the sensing element by a cable, and transmits a signal from the sensing element to the base unit, for example in pulsed infrared light. A receiver arranged to decode the signal from the sensing element is coupleable in communication with the computer terminal, for example, being wired to an asynchronous serial port. The transmitter can be physically attached to the user by a wrist strap or the like, and can have an optional hard wired plug attachment to the base unit, for an alternative communication path and/or for charging a battery that powers the transmitter.

Additional variations are possible and a number of them will be apparent from a review of the following discussion of some exemplary embodiments.

BRIEF DESCRIPTION OF THE DRAWINGS

There are shown in the drawings embodiments of the invention as presently preferred. It should be understood that the invention is not limited to the embodiments that are specifically discussed, and is capable of variation in accordance with the scope of the appended claims. In the drawings.

FIG. 4 is an elevation view showing an alternative embodiment.

FIG. 5 is a partial section view corresponding to line 5—5 in FIG. 3.

FIG. 6 is a partial section view corresponding to line 6—6 in FIG. 4.

DETAILED DESCRIPTION OF THE PREFERRED EMBODIMENTS

Figure 1:
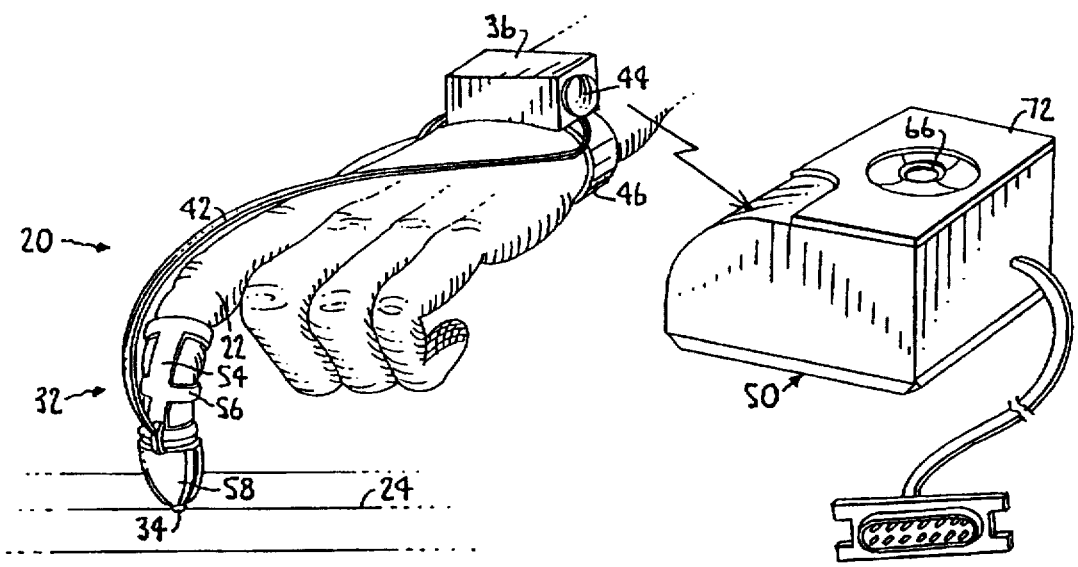
FIG. 1 is a perspective view showing a preferred embodiment of a finger operated digital input device according to the invention, in operation.

Referring to FIG. 1, according to the invention a digital input device 20 is provided for operation via a user's finger 22. The device is attachable to the user's finger, e.g., the index finger, and can be used on any surface 24 to sense and decode the direction and amount of displacement of the device 20 over the surface 24, in a manner similar to a computer mouse.

A thimble 32 is dimensioned to engage snugly on the user's finger 22. The thimble can be an integral resilient structure (e.g., of plastic), or can include plural parts adapted to be worn on the finger, such as a partial finger-encircling structure and a closure means such as one or more Velcro straps. Mounted in a sensor housing at the extreme end of the thimble 32, is a sensor arrangement operable to detect the relative displacement of the thimble over a surface. In a preferred embodiment the sensor arrangement involves a roller that engages frictionally with the surface, and sensing means for detecting incremental rotation of the roller in mutually perpendicular directions over the surface. Other sensing arrangements are also possible, such as an electro-optical or electromagnetic arrangement wherein the sensing means detects passage over grid lines on the surface. For example, grid lines which are distinguishable optically (e.g., by color, polarization or the like) or electromagnetically (e.g., by polarity) can be set in the surface and detected by the sensing means. Preferably, such grid lines are provided on an otherwise-transparent layer or sheet, which can be overlaid on a display screen or over any sheet material, diagram, etc., which is to be encoded, traced or outlined.

In the embodiment shown, the displacement of the device over a surface is arranged to rotate a contact roller ball 34, that is placed at the end of the end of the user's digit, exposed and arranged to rotate freely in the thimble 32 due to contact with surface 24. The rotation of the ball 34 is sensed in two perpendicular directions and communicated to the computer or other processor, which interprets rotation of the ball as displacement. The contact roller 34 engages frictionally against the surface 24, and can have a polymer surface or can be provided with a toughened surface for good engagement. Relative movement of the thimble 32 over the surface 24 causes rotation of the contact roller 34.

A detector circuit 36 is coupled to the roller 34 and is operable to sense rotation in the two mutually perpendicular directions. The detector circuit 36 emits a signal responsive to incremental rotation of the contact roller 34 in the two mutually perpendicular directions, which can generate signals on separate channels, for encoding a displacement of the roller on the surface. The detector circuit 36 can be coupled to the roller 34 via optical means such as a fiber optic cable 42, or part or all of the circuitry can be mounted on or in the thimble 32.

In the embodiment shown in FIG. 1, the thimble 32 is coupled to a local transmitter 44 attached to the user's wrist via a strap 46. The local transmitter 44 transmits its signal to a base unit 50, and the base unit is coupleable to a computer terminal (not shown in FIG. 1), for example to a conventional asynchronous serial port.

Figures 2, 3:
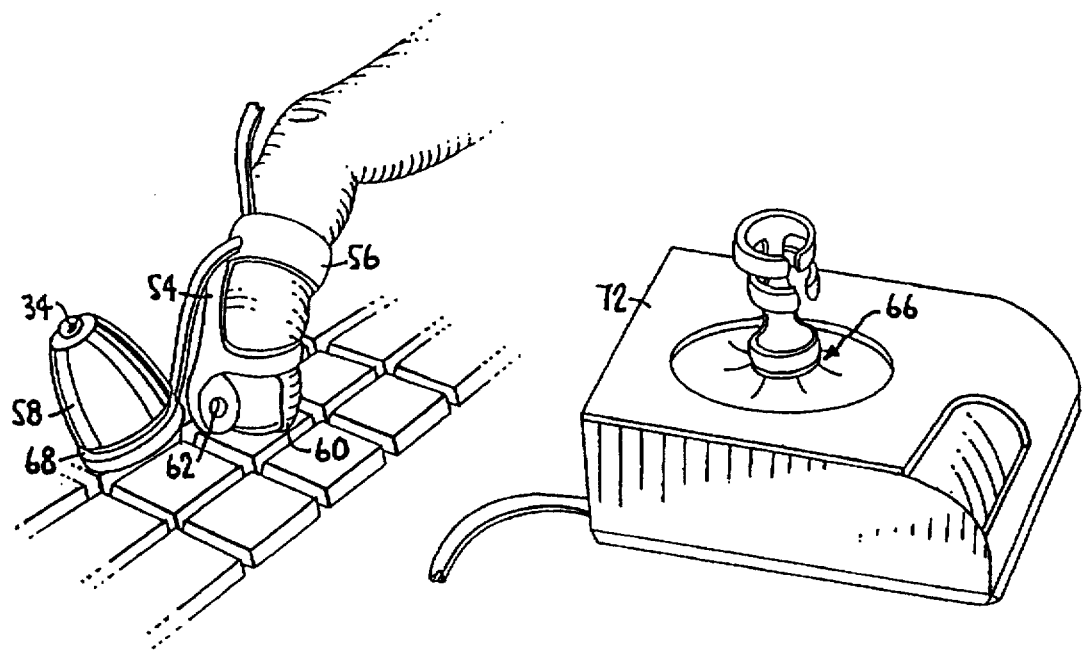
FIG. 2 is a perspective view showing the thimble portion of the device with the end portion pivoted clear for allowing the user to type.
FIG. 3 is a perspective view showing the thimble operatively engaged in the base member.

Preferably, the thimble 32 has an exoskeleton-like mounting part 54 having a number of ring strips 56 that are resilient and enclose partway around the user's finger 22, for example encompassing the last two phalanges of the index finger. However, belts or straps, glove-like arrangements and the like are also possible. The thimble shown has a sensor housing 58 coupled to the mounting part 54 in a manner whereby the sensor housing 58 is movable relative to the mounting part 54 for retracting the sensor housing 58 to expose an end 60 of the user's finger as shown in FIG. 2. When the sensor housing 58 is moved clear of the mounting part 54, and the end of the user's finger is exposed, at least limited typing is possible without removing the thimble 32. Preferably, the sensor housing 58 is pivotable on the mounting part 54 as shown, with the sensor housing being pivotable rearwardly over the user's finger, on a hinge pin 62 oriented to define an axis transverse to the longitudinal axis of the finger.

The signal lines from housing 58 can be routed through a switch (not shown) associated with the sensor housing and the mounting part, for enabling and disabling operation of the input device based upon whether or not the housing 58 is in operable position relative to the mounting part 54. For example, a limit switch on either the housing 58 or mounting part 54 can open or close by contact with the other, for making and breaking connections from the sensor in housing 58 for the X and Y displacement of the sensor housing and/or for the signal from the click button 176 (see FIG. 4) thereon. Similarly, such a switch can generate a status signal as a function of the relative positions of the housing 58 and mounting part 54, whereby the signals simply can be ignored when the device is hinged or otherwise moved to an inoperative position.

The hinge structure can be detachable, to permit the sensor housing to mount on mounting parts of different sizes. Thus, the sensor can be worn by users having different size fingers. Additionally, a small diameter mounting part can be affixed to the sensor housing to enable the mounting part to attach to a stylus such as a pencil, whereupon the same device is converted into an input device resembling a writing implement. When embodied as a writing device, the invention is particularly useful for tracing outlines on maps or drawings, particularly since the user has a generally clear view of the surface being traced over.

The input device 20 is alternatively useful for encoding translational movement of the contact roller 34 over a surface, as shown in FIG. 1, and also for pointing, which is primarily a matter of angular displacement resembling the operation of a joystick. These two uses can be accomplished when wearing the mounting part and sensor housing on a finger, or when the mounting part and sensor housing are attached to another structure such as a stylus. For encoding angular displacement, the sensor housing 58 is removably coupleable to the base unit 50 as shown in FIG. 3. The base unit 50 defines an opening 66 into which the thimble 32 is plugged and resiliently captured. The opening 66 in the base unit 50 and the outer contour of the thimble 32 engage so as to define a universal joint substantially in the plane of the opening 66. For example, the thimble 32 can have a peripheral groove 68 that snaps into an opening in the top wall 72 of the base unit 50.

FIG. 4, which illustrates an alternative form of thimble 32, shows the peripheral groove 68 and FIG. 5 illustrates sectionally how the peripheral groove 68 is snapped into place. Throughout the drawings the same reference numbers have been used to identify the corresponding elements in the respective embodiments. The base unit 50 has a contoured internal surface 74 on which the contact roller 34 rests. The contoured surface 74 can be spherical and substantially concentric with the center point defined by the universal joint coupling the thimble 32 with the base unit 50.

In the embodiment shown, the coupling between the thimble and the base unit is due the inner edges of the top wall 72 of the base unit 50 snapping resiliently into the peripheral groove 68. In order to angularly displace the thimble 32 relative to the center point, it is necessary to deform the top wall 72 by relatively raising the wall abutting the thimble 32 on one side and relatively lowering the wall on the other side. Accordingly, the top wall 72 is made relatively thin and resilient to enable this action. Other specific couplings are also possible, such as a gimbal ring arrangement (not shown) having an inner ring that snaps onto the thimble, an intermediate ring arranged to rotate relative to the inner ring on a first axis, and an outer ring arranged to rotate relative to the intermediate ring on an axis perpendicular to the first axis.

The contact roller 34 is positioned by the universal joint connection to occupy a point on the spherical surface 74. A spherical running surface is provided along the required line by an internal cup shaped member 76 in the base unit 50. The cup shaped member 76 can be attached along the outer edges of the top wall 72, or can be mounted to permit some vertical displacement, e.g., being carried on springs that urge the surface upwardly and thereby maintain some pressure against the contact roller 34. The surface 74 of the cup shaped member can be roughened or provided with a resilient covering in a manner similar to a mouse pad, to enhance friction with the contact roller 34.

The thimble 32 is disengageable from the base unit 50, whereby the contact roller is usable on any surface for translational encoding, and engageable in the base unit 50 for use in angular displacement encoding. When used on a surface other than the upper surface 74 of the cup shaped member 76 of the base unit 50, or when used in the base unit, the input to the computer system is the same, namely a train of pulses arranged to encode the direction and extent of movement of the contact roller 34 on the respective surface.

The signals needed to encode positive and negative displacement along two axes can be encoded in various ways. In a system capable of sensing the direction of motion of the roller, the direction and the incremental extent of displacement can be signalled, requiring two signal lines for each of the axes. It is also known, for example in shaft angle encoders and the like, to use two signal lines for each of the axes, arranged to sense variation along parallel lines. The variations encode two digital lines that are out of phase. A flip-flop responsive to the phase relationship of the signals on two lines is set or reset to encode direction and the pulses produced by one or the other of the lines encodes the extent of displacement.

Digital variations representing incremental displacement according to the invention are detected using sensing rollers 80 that either bear against the contact roller 34, or preferably, bear against an intermediate roller 82 that is larger than the contact roller 34 as in FIG. 6. Two sensing rollers 80 are coupled mechanically to rotate upon rotation of the contact roller 34, the sensing rollers 80 being rotatable on mutually perpendicular axes 85 for passing digital variations 86 before a detector circuit 88 having an X detection circuit responsive to rotation of one of the sensing rollers and a Y detection circuit responsive to the other of the sensing rollers. The sensing rollers 80 turn when the roller against which they bear turns at least partly around the axis 85 of the respective sensing roller. When a roller turns in a direction parallel to the axis 85, the respective sensing roller 80 slips. The sensing rollers are frictionally engaged against the contact roller 34 or intermediate roller ball 82, but inherently can only rotate around their respective axes 85.

The detector circuit 88 includes at least one sensing element 92 for each of the mutually perpendicular directions and the sensing rollers 80 each are operable to pass a surface having regular digital variations before a respective sensing element upon rotation of the contact roller 34, producing an output signal that is pulsed as a function of movement of the contact roller. Preferably, the variations 86 are variations of one of light reflectivity and light transmissiveness, however, magnetic variations are also possible and can be encoded on a strip of ferromagnetic material to a high resolution. The sensing element 92 thus can include a light source 94 and light detector 96 for each line of variations to be detected, or perhaps a single light source 94 and two detectors 96. In the embodiment shown, the light source and/or detectors are coupled to the surfaces carrying the digital coding variations by cables 42 of fiber optic or other materials. For magnetic variations, a sensing coil is arranged to detect changes in the polarity of a magnetic field, and the signal is carried on a wire conductor.

The embodiment in FIG. 6 incorporates a preferred arrangement wherein the sensing rollers 80 bear against a large intermediate roller 82 that bears in turn on the contact roller 34. A spring biasing means urges together at least two of the sensing rollers 80, the intermediate roller ball 82 and the contact roller 34 to encourage them to rotate in registry. The surfaces of one or more of the rollers/balls can be treated to enhance friction between them, for example using a rubbery coating, a toughened surface configuration or the like.

Figure 7:
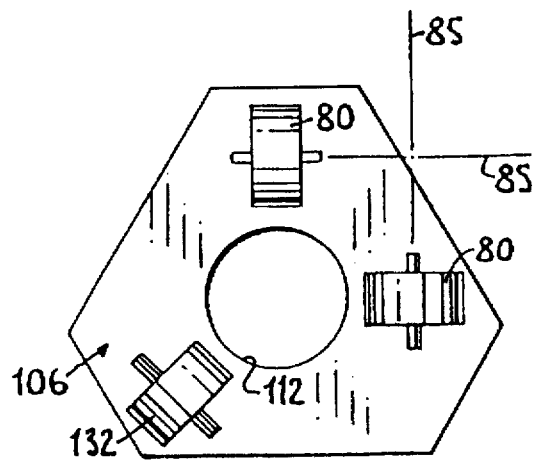
FIG. 7 is a schematic plan layout taken along line 7—7 in FIG. 6.

As shown in FIGS. 6 and 7, the sensing rollers 80 are mounted on a support 106 operable to bear against the intermediate roller ball 82, the support 106 being urged toward the intermediate roller ball 82 and toward the contact roller 34 by at least one spring 104, bearing between the housing 58 and the support 106, which in this case is a plate having a central opening 112 fitting partway over the intermediate roller ball 82. The support plate 106 can have a low friction coating such as Teflon, at least in the area of the inward facing edges defining the opening 112. Alternatively, by employing friction enhancing surface configurations on the contact roller 34 and the sensing rollers 80, the intermediate roller ball 82 can be a smooth bearing, e.g., of polished stainless steel, that turns readily in opening 112.

The sensing rollers 80 are fixed to rotate on the plate 106, each of the sensing rollers 80 having an axle 114 attached to the surface of the plate and the sensing rollers 80 protruding through the plane of the plate 106. At least one metering strip 118 or the like is arranged to rotate with a respective one of the sensing rollers 80. The metering strip has regular digital variations 86 in at least one of light reflectivity, light transmissiveness and magnetic field polarity, for one or more channels. A sensing element such as fiber optic cable 42 is operatively directed at the metering strip 118, whereby upon rotation of the contact roller 34, the sensing element produces an output signal that is pulsed as a function of movement of the contact roller 34. The metering strips 118 in the embodiment of FIGS. 6 and 8 are belts that pass around idler rollers 122 that can be mounted on standoff posts 124 relative to the support 106 or can be mounted on an inner surface of the housing 58 as in FIG. 8.

It is also possible to have the digital variations 86 printed, magnetized or otherwise formed on the sensing rollers 80. For example, two lines of digital code can be printed or magnetically encoded on a ferromagnetic strip, along the peripheral edge or axial side of the sensing rollers 80. Alternatively, the sensing rollers 80 can be arranged with regularly spaced holes or transparencies that are sensed using a paired light source and a photodetector. Such an arrangement places the metering strip around the sensing rollers 80 without the mechanical complication of an idler belt.

FIG. 7 shows the arrangement of the sensing rollers 80 on the support plate 106. According to the embodiment shown, in addition to the X and Y sensing rollers, which are arranged perpendicular to one another, a diagonal roller 132 is included as well and is mounted opposite the midline between the sensing rollers 80. The diagonal roller 132 helps to retain the support plate 106 in proper position, opposing the tendency of the support plate to become canted by uneven contact due to the two sensing rollers 80 at 90° spacing around the intermediate roller ball 82. It would also be possible to obtain a signal from the diagonal roller 132, however the diagonal roller signal would represent the geometric sum of the signals of the other sensing rollers 80. While such a signal may be useful, for example as a redundancy or a means for correcting the output in the event of unwanted slippage of one of the sensing rollers, it is not strictly necessary.

Figure 8:
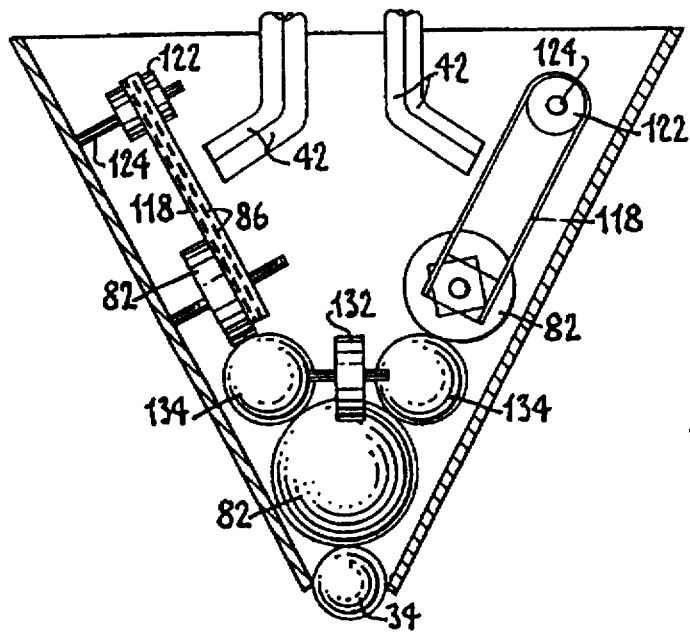
FIG. 8 is a section view corresponding to FIG. 6 and showing an alternative embodiment.
Figure 9:
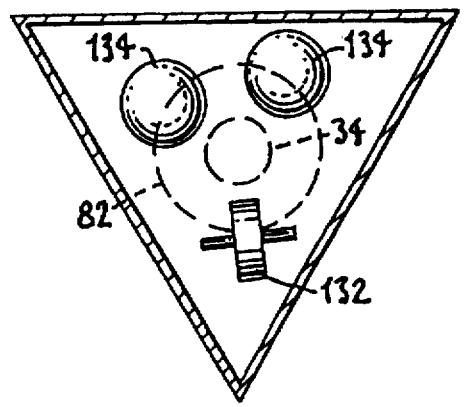
FIG. 9 is a schematic plan layout along line 9—9 in FIG. 8.

FIGS. 8 and 9 show an alternative arrangement of the contact roller 34, the intermediate roller 82 and the sensing rollers 80. In this arrangement, each of the sensing rollers 80 is pressed against a buffering intermediate roller ball 134 that is in turn pressed against the larger intermediate roller 82. In this arrangement the sensing rollers 80 need not slip relative to their buffering rollers 134 in a direction parallel to their rotation axes 85. Instead, the buffering rollers 134 are constrained by the sensing rollers 80 to rotate only along the corresponding sensing axis and slippage either occurs only between the buffering rollers 134 and the larger intermediate roller 82 or the slippage is divided between the points of contact between the sensing rollers and the buffering rollers, and between the buffering rollers and the intermediate rollers, respectively. As shown in FIGS. 8 and 9, this embodiment also includes an idling roller 132 disposed opposite the midline between the buffering rollers 80. According to this embodiment, the buffering rollers 134 serve a function similar to the support plate 106 in FIGS. 6 and 7. The sensing rollers 80 can be mounted on the inside walls of the sensor housing 58 via posts 124, with the illumination and sensing means including fiber optic cables 42 directed to a point along the metering strips 118.

Figure 10:
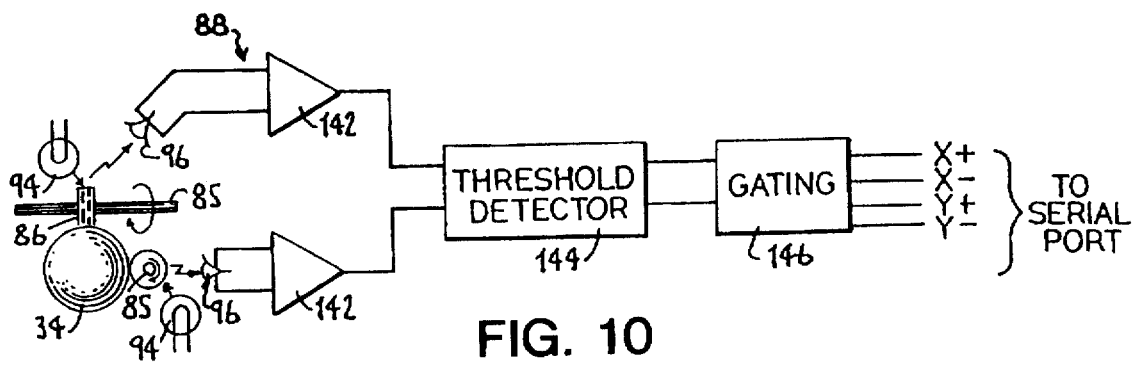
FIG. 10 is a schematic block diagram showing a driving circuit for the device.

FIG. 10 shows a general schematic circuit diagram according to the invention. The sensing rollers 80 in this embodiment have two lines of digital light/dark variations 86 printed out of phase with one another along the peripheral edges of the sensing rollers. Illumination sources 94 are directed at these variations 86 and two photodetector sensors 92 for each sensing roller 80 (only one being shown in the drawing) detect the changes in reflectivity caused by passage of the digital variations 86 due to rotation of the sensing rollers 80 with corresponding rotation of the contact roller 34 on the respective axis. The photodetector signals are amplified by amplifiers 142 and coupled to a threshold detector 144 for distinguishing light from dark. A gating means 146 compares the phase of the variations on the two channels for each axis and outputs signals representing positive and negative movement in the X and Y directions.

FIG. 10 illustrates the output signals as ±x and ±y counts. It will be appreciated that the same information could be represented by a line for the count and another line for the direction (positive or negative). The information can be communicated to a processor 150 via parallel signal lines or on a serial line.

Figure 11:
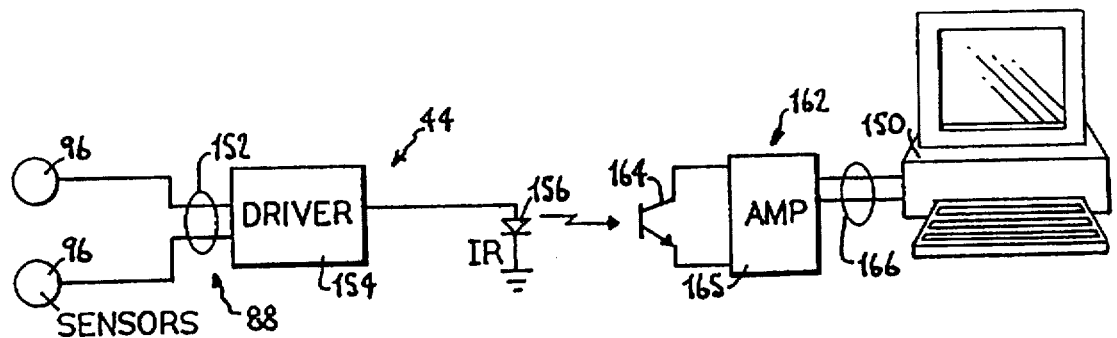
FIG. 11 is a schematic block diagram illustrating communication with a computer terminal over a wireless signal path.

The output of the sensing device 20 can be coupled directly to a computer input by a cable, however this requires that the user remain connected physically to the computer terminal 150. In order to dispense with such a connection, a wireless communication path is preferably provided as shown in FIG. 11. A transmitter 44 is coupled to the sensing element 92 by a cable 152, and is operable to transmit a signal generated from the sensing element. In FIG. 11, the sensor signals are coupled to a transmitter driver 154 having a transmitter coupled to the output. The transmitter can comprise an infrared emitting LED 156 or similar signalling device. The infrared LED 156 can be placed behind a diffusing lens 158 or the like in the housing of the base unit 50 as shown in FIG. 5. A receiver 162 includes a photodetector 164 responsive to the infrared signal and is operable to receive the signal, which is amplified by amplifier 165. The receiver 162 is coupled to the computer or processor 150 by a cable 166. The transmitter 44 is worn by the user, for example via wrist strap 46. The base unit 50 (which includes the receiving and decoding means) is wired to the computer 150. Whereas the transmitter 44 and receiver 162 are not coupled by a cable, the user is free to move about, and in fact can operate the input from across the room. The transmitter 44 can be battery powered, and can have an alternative electrical coupling to the base unit whereby the battery can be charged and/or by which signals can be transmitted over hard wires, optical cables, inductive couplings or the like.

Figure 12:
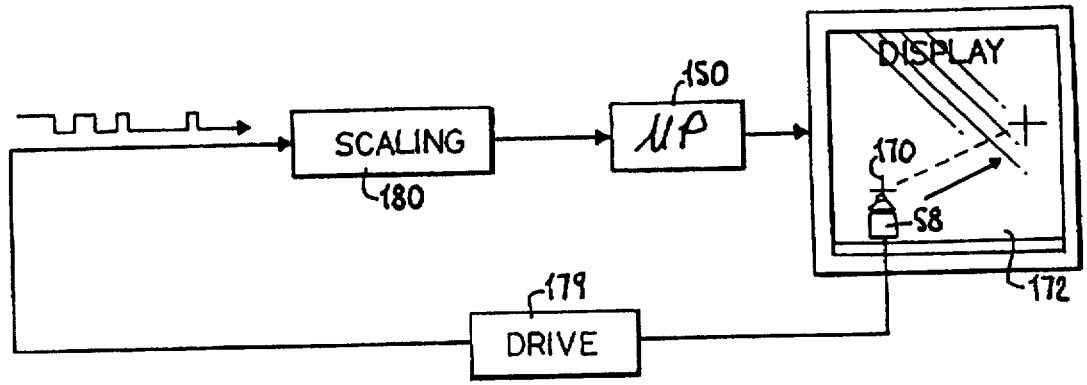
FIG. 12 is a schematic illustration of scaling the output of the device for enabling direct use on a computer display screen.

The invention is used as shown functionally in FIG. 12, in conjunction with software, to control the movement of a pointer or cursor 170 on a display screen 172. As shown in FIGS. 4 and 5, the sensor housing 58 or the mounting part 54 can carry one or more pushbutton switches 176 for coupling not only the position information but also "click" signals to the processor 150. The click button(s) 176 can be located on a lateral side of the sensor housing 58, where it is comfortable and convenient to operate the click button via the user's thumb when the sensor device 20 is attached to the user's index finger.

The positioning output of the sensor device 20, preferably as processed through driving circuits 179 is preferably scaled, potentially by hardware Circuitry but preferably by a software function, either possibility being contemplated by scaling block 180 in FIG. 12. Accordingly, the extent of displacement of the cursor 170 on the display screen 172 as controlled by the processor can be made precisely equal to the extent of physical displacement of the sensor housing 58 over the surface 24. This has the benefit that the input device 20 can be used directly on the face of the display screen 172 as shown in FIG. 12, effectively allowing the user to touch a cursor 170 being displayed on the screen 172 and via the computer 150 to move the cursor 170 by dragging it along with physical displacement of the sensing device 20 over the surface of the screen 172. This arrangement also can permit the user to block areas on the screen by drawing a line around them, because the processor can relate the scaled input of the input device 20 to the position of the cursor to which it points. In order to function as a "direct" input in this manner, which effectively is a simplified touch screen input, the orientation of the sensing device 20 is critical. For example, if the sensing device 20 is upside down, displacement of the cursor 170 will occur opposite to the direction intended. It is simple and natural, however, for the user to align the sensing device 20 along a vertical line, substantially normal to the plane of the display screen, when moving or outlining sections of interest. This is a normal pointing movement. The nominal vertical line of the sensing roller axes 85 can be indicated visually on the device 20 to assist the user in aligning it correctly on the finger. Moreover, cumulative error in the position of the displaced cursor 170 from the point of contact between the input device 20 and the screen 172 is evident visually to the user, who can adapt quickly by adjusting the orientation of the input device 20 to obtain accurate positioning, or lift the contact roller 34 from the screen to place it on the displayed position of the cursor 170.

The format display size of computer terminals varies with the particular display used. By providing in software for an empirical test when setting up a program for driving the input device 20, a scaling factor can be recorded and thereafter applied to make the displacement of the cursor 170 equal to that of the sensing device 20. For example, a driver setup routine can display two points and prompt the user to draw a straight line between them, perhaps including clicking on the starting and ending point. The routine relates the extent of detected displacement (i.e., the count of digital variations sensed) to the number of pixels between the points as displayed, for determining the factor which is then stored and used by the driver routine, rendering the device accurate regardless of the overall format display size. Insofar as variations in vertical size and horizontal size may occur between terminals, a separate factor for X and Y scaling is also possible.

Figure 13:
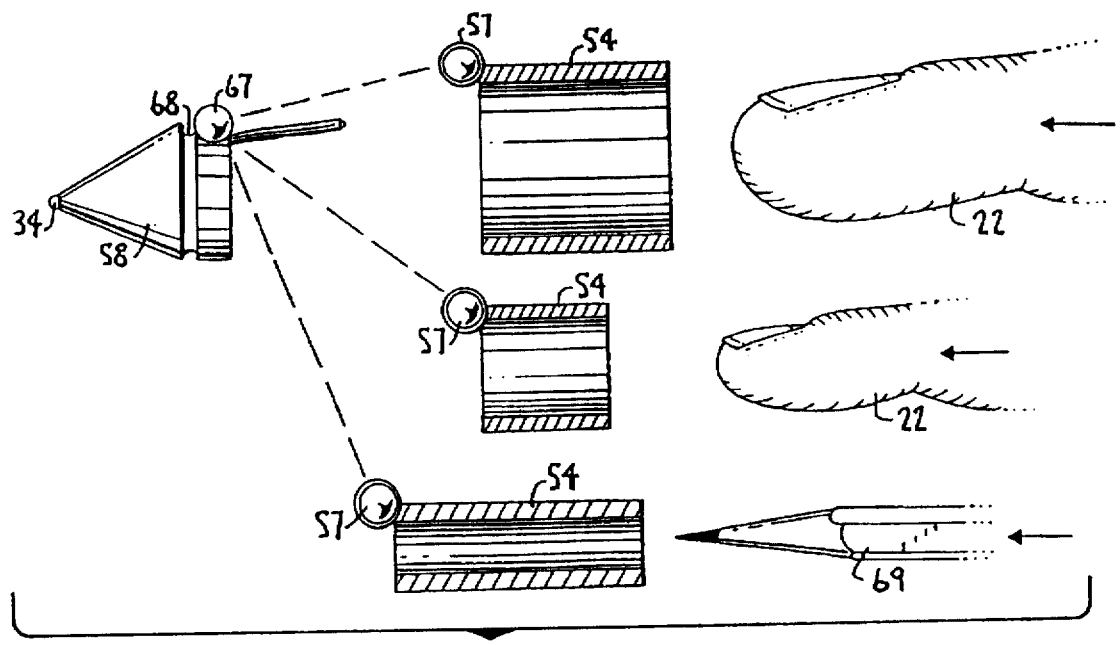
FIG. 13 is a schematic elevation view, partly in section, showing alternative thimbles dimensioned for different fingers and for a stylus.

FIG. 13 schematically illustrates some alternative thimble arrangements wherein mounting parts of different diameters and types are alternatively attachable to the sensor housing. By making the sensor housing 58 and the mounting parts 54 removably attachable, for example, via a resilient clasp 57 on one of them, that interacts with a ball or pair of oppositely protruding hinge pins 67 on the other, larger or smaller mounting parts or mounting parts of different types can receive the sensor housing. Preferably, the alternatively attachable mounting parts include a small diameter mounting part that receives a stylus 69, as shown. When the sensor part 58 is attached to a stylus 69, tracing functions on surfaces are enabled. When the stylus-attached housing is placed in the base unit, the invention operates in a manner similar to a joystick in that the stylus forms a joystick handle whereby angular displacements can be encoded.

Figure 14:
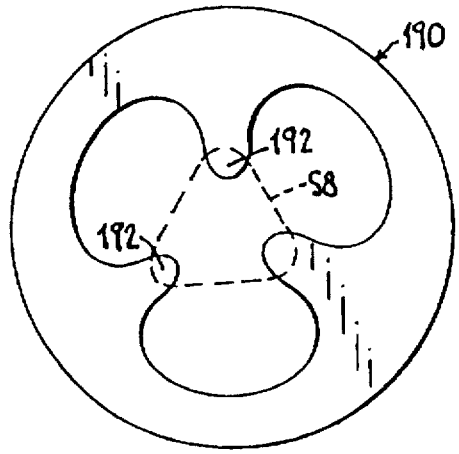
FIG. 14 is a plan view of a mounting disc for receiving the thimble in operative relationship to a base.

The thimble is removably attachable to the base unit at a form of universal joint. FIG. 14 is a plan view of a mounting disc 190 for receiving the thimble in operative relationship to a base. The mounting disc 190 is arranged to rotate freely around its axis, e.g., being arranged in a slot defined at the top wall of the base unit, and has three radially-inward extending support fins 192. The mounting disc is resilient, allowing the fins 192 to flex when angularly displacing the longitudinal axis of the thimble (and finger) relative to the center axis of the mounting disc, thus forming a universal joint at least within a limited angular span of displacement.

Figure 15:
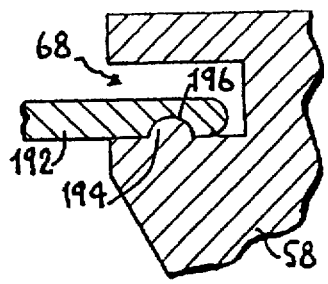
FIG. 15 is a partial section view taken along the mounting groove in the thimble sensor housing, illustrating a twist-and-lock arrangement for removably locking the sensor housing in the mounting disc according to FIG. 14; and, FIGS. 16 is a partial section view of an alternative embodiment corresponding to FIG. 15, showing an arrangement permitting axial retraction of the sensor housing from the disc.

For rendering the thimble detachable from the mounting disc, the fins 192 of the mounting disc and the slot of the thimble can have a push and twist locking arrangement as shown in FIG. 15, whereby the triangular cross-section housing 58 is fit into the openings between fins 192, and twisted such that the fins lock to complementary shaped means in the slot 68 of housing 58. FIG. 15 is a section view taken along the mounting groove in the housing part 58 of the thimble, illustrating detent protrusions 194 formed in the walls defining the slot 68 of the thimble. The fins 192 of the mounting disc are provided with complementary detent concavities 196 into which the detent protrusions 194 snap when housing 58 is twisted into place. The concavities can lead into feed slots on the surface of the fins, particularly if only a clearance fit is provided for fins 192 in slot 68. The housing 58 is triangular in cross section, to fit into the space defined between the three fins of the mounting plate. Twisting housing 58 moves the detent protrusions to align with the concavities on the fins, where the protrusions and concavities snap together as shown in FIG. 15.

Figure 16:
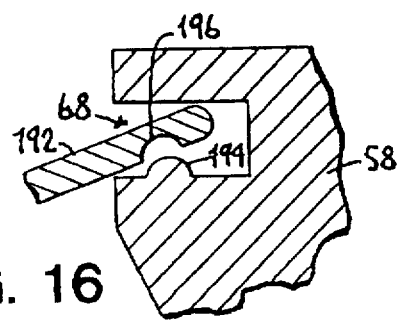

FIG. 16 is a partial section view showing an alternative arrangement where more than a clearance fit is provided between the walls of slot 68 and the fins 192. As an alternative, or in addition to twisting for removal of the thimble, it is also possible as shown to allow the housing 58 to be pulled axially out of engagement with the fins 192. Inasmuch as the mounting disc is resilient, axial force tending to pull the thimble from the mounting disc in this embodiment causes the fins to lever up from the detent protrusions, around the edge of slot 68. The housing can be pulled free of the fins 192, or twisted back to the spaces between the fins without interference from the detents, which are thus disengaged.

The invention having been disclosed in connection with a number of exemplary embodiments, variations on the inventive concept will now be apparent to persons skilled in the art. Whereas the invention is not intended to be limited to the embodiments disclosed as examples, reference should be made to the appended claims rather than the foregoing examples, in order to assess the scope of the invention in which exclusive rights are claimed.

We claim:

1. A digital input device for operation via a user's finger, comprising:

a thimble dimensioned to engage the user's finger;

a sensing means arranged at an end of the thimble, the sensing means being operable to encode displacement of the thimble relative to a separate surface and to produce a signal as a function of said displacement; and, means for communicating the signal to an external device, whereby the user can encode data by wearing the thimble and displacing the thimble and the sensing means over the separate surface;

wherein the sensing means comprises a contact roller that is rotatable in the thimble by relative movement between the contact roller and the separate surface, and further comprising a detector circuit operable to generate the signal responsive to incremental rotation of the contact roller along at least two axes; and, wherein the detector circuit comprises a plurality of sensing rollers coupled mechanically with the contact roller to rotate upon rotation of the contact roller, the sensing rollers being rotatable on distinct axes, and wherein the sensing rollers each are operable to pass a surface having regular variations before a respective said at least one sensing element upon rotation of the contact roller, the sensing element producing an output signal that is pulsed as a function of movement of the contact roller.

2. The input device according to claim 1, wherein the detector circuit is operable to generate the signal responsive to incremental rotation of the contact roller in two perpendicular axes.

3. The input device according to claim 1, wherein the sensing means further comprises an intermediate roller ball frictionally engaged against the contact roller, and two sensing rollers arranged against the intermediate roller ball, the sensing rollers being frictionally engaged against the intermediate roller ball and constrained for rotation in distinct axes.

4. The input device according to claim 1, wherein the variations are variations of one of light reflectivity, light transmissiveness and magnetic field, and wherein the sensing element comprises a detector responsive thereto.

5. The input device according to claim 4, wherein the variations are provided in at least two lines of digital code and wherein the detector circuit comprises two sensing elements for each of mutually perpendicular directions, the at least two lines of digital code being arranged for encoding a direction and an extent of movement of the contact roller.

6. The input device according to claim 1, further comprising a base unit, the base unit defining an opening for engaging the thimble, the opening and the thimble engaging so as to define a universal joint, and wherein the base unit has a contoured surface on which the contact roller rests.

7. The input device according to claim 6, wherein the thimble is disengageable from the base unit, whereby the contact roller is usable on any surface.

8. The input device according to claim 6, wherein the contoured surface defines a spherical surface concentric with a center of the universal joint.

9. The input device according to claim 6, wherein the base unit includes means proximate the opening for releasably resiliently engaging the thimble such that the base unit and the thimble are relatively mounted to engage the contoured surface and the contact roller under resilient pressure.

10. The input device according to claim 6, further comprising a stylus dimensioned to fit in the thimble, whereby the input device is alternatively usable as a finger operated device, a pen device and as a joystick in the base unit.

11. The input device according to claim 6, wherein the thimble further comprises:

a stylus/finger-engaging portion and a separate housing for housing the sensing means, which separate housing of the thimble is detachable from the stylus/finger-engaging portion of the thimble, and, further comprising at least one additional stylus/finger-portion of a different diameter, for affixing the sensing means housing to at least one of a different user and stylus.

12. The input device according to claim 1, wherein the contact roller is disposed relative to a distal end of the user's finger at a position spaced from said distal end in a direction extending distally from said distal end.

13. A digital input device for operation via a user's finger, comprising:

a thimble dimensioned to engage the user's finger;

a sensing means arranged at an end of the thimble, the sensing means being operable to encode displacement of the thimble relative to a separate surface and to produce a signal as a function of said displacement; and, means for communicating the signal to an external device, whereby the user can encode data by wearing the thimble and displacing the thimble and the sensing means over the separate surface;

wherein the thimble comprises a mounting part operable to engage the user's finger and a sensor housing coupled to the mounting part, the sensor housing being movable through operative positions relative to the mounting part between one extreme position cupping said end of the user's finger in thimble-like fashion and an opposite extreme position exposing an end of the user's finger, whereby typing is enabled without removing the mounting part thimble.

14. The input device according to claim 13, further comprising a transmitter coupled to the sensing means by a cable, the transmitter being operable to transmit a signal from the sensing element, and a receiver operable to receive the signal from the sensing element, the receiver being coupleable in communication with a processor.

15. The input device according to claim 14, wherein the transmitter is powered by a battery.

16. The input device according to claim 15, wherein the receiver is disposed in a base unit and further comprising means for alternatively coupling the transmitter to the base unit for charging the battery.

17. The input device according to claim 14, wherein the transmitter comprises an infrared signalling device.

* * * * *